Jan. 20, 1959 H. O. WOLFF 2,869,201

ATTACHING DEVICE

Filed May 24, 1954

INVENTOR.
HARRY O. WOLFF
BY Hudson, Boughton,
Williams, David & Hoffmann
ATTORNEYS United States Patent Office 2,869,201
Patented Jan. 20, 1959

2,869,201

ATTACHING DEVICE

Harry O. Wolff, Lakewood, Ohio

Application May 24, 1954, Serial No. 431,773

2 Claims. (Cl. 24—81)

The present invention relates to a clip provided with means for supporting an article, which clip is adapted to cooperate with what may broadly be called a rail or support, by being snapped into position upon the rail and there retained firmly in position until it is desired to, as it were, unsnap the clip and remove it from the rail.

The rail to which reference has been made, may be supported in any desired fashion and may be of different shapes, but in the present instance the clip herein described, is particularly fashioned to cooperate with what may be termed a flat rail.

It is, of course, not uncommon to fashion some supporting member which might be denominated a clip, to another support or rail, by means of permanent fastening, such as a bolt and nut construction, but in the instances recited the clip is essentially permanently fastened to the rail and usually is so fastened that it is placeable upon the rail in a preselected position, the rail being provided with a hole to so receive a fastening bolt.

The purpose of the present invention is to provide a clip which may be mounted and held in position upon a rail in any desired position upon the rail so that the place upon the rail with respect to which the clip is to be mounted may be selected in accordance with the requirements incident to the device which is to be supported. Furthermore, it is desirable that the clip shall be mounted upon the rail by a snap action which will serve to definitely and firmly hold the clip in its applied position upon the rail but which will nevertheless permit of the removal of the clip when such is desired.

A further desirable object of the use of the clip is that it shall be simple in construction, involving a relatively low cost of manufacture and of material which will enable its repeated use as a clip without detriment to the efficiency of the clip itself.

Reference should be had to the accompanying drawings forming a part of the present invention in which Fig. 1 is an elevation of the clip in position upon a rail and in dotted lines the indication of an article which is held by the clip;

Figure 1:
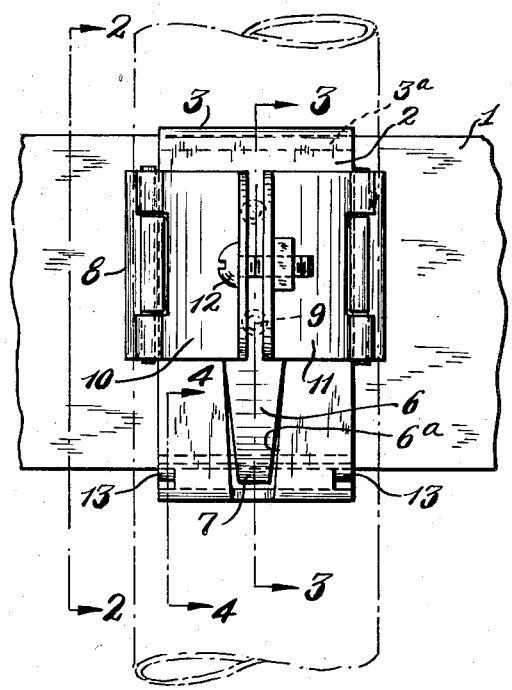

As an example of a rail upon which the clip of the present invention may be mounted, there is shown the rail 1. This rail as shown, is a flat strip and may be mounted upon any structure or in any manner that may be desired. In connection with the rail 1 there is shown a clip which is particularly formed and adapted to cooperate with such a rail. However, it will be obvious that the configuration of the rail may be altered from that which is shown which may involve to some extent a variation in the design of the clip which is used with such rail, but such can be accomplished without departing from the principle of construction embodied in the clip as presented.

The clip is made from a single piece of metal and will be of a width which may be selected as the necessity may demand. In the present instance it is made from a piece of strip metal, which metal is of such a nature that it has a certain amount of inherent elasticity in order that portions may be flexed to a limited extent to accomplish the snap action effective in mounting the clip upon the rail and which will be more particularly described later.

The body of the clip is indicated at 2, and at the upper end of the clip, there is a reversely bent portion which is indicated at 3, and which has a downwardly extending lip 3ª. The structure which has just been described forms a re-entrant recessed portion which is of such width and depth as to engage with the upper portion of the rail, extend across the same and hook upon the reverse or inner side of the rail.

The body of the clip is of a length slightly greater than the depth of the rail in connection with which it is to be used and the body portion at its lower end is provided with a reversely folded extension 4, the end portion of which extension is reversely folded upon the part 4, as indicated at 5. The form of the part 5, that is to say, with respect to the length of such folded part, will depend upon the thickness of the rail with which the clip is adapted to be used. The portion 5 will be so formed that when the body of the clip lies against the front or face portion of the rail, and the reversely folded part 4 extends beneath the lower end of the rail, the part 5 will engage with the inner face of the rail to provide a holding and secure position for the clip with respect to the body of the rail.

A portion of the front of the clip body is formed to provide a tongue 6; this tongue being formed by slitting the metal as indicated at 6ª and providing an inwardly bent finger which is indicated at 7. The tongue 6 is somewhat resilient due to the inherent resiliency in the metal and is adapted to extend, when the clip is in position, beneath the lower portion of the rail and engage with such portion.

Figure 2:
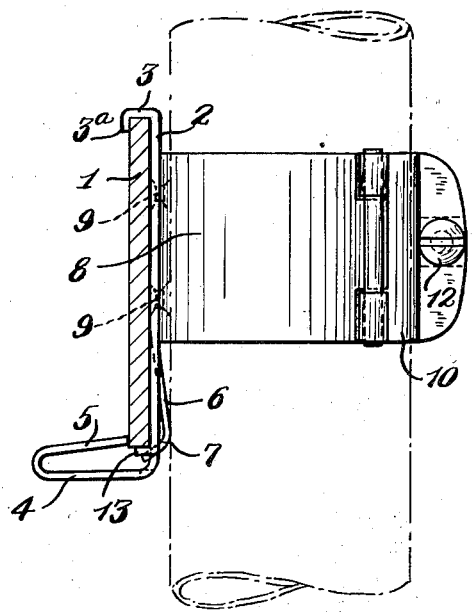
Fig. 2 is a vertical section with parts in elevation taken upon the line 2—2 of Fig. 1.
Figure 3:
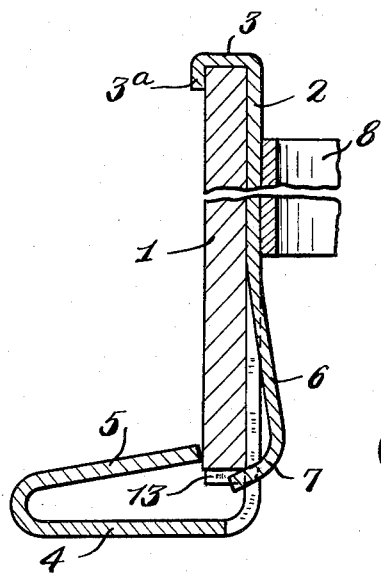
Fig. 3 is an enlarged vertical section upon the line 3—3 of Fig. 1.
Figure 4:
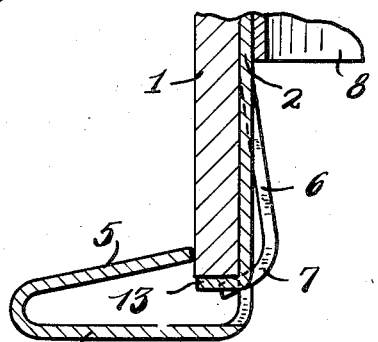
Fig. 4 is an enlarged fragmentary section of the lower part of the clip, taken on line 4—4 of Fig. 1.

It will be obvious that when the clip is applied to the rail and the part 3 thereof is placed over the top of the rail, and the clip is pushed toward the rail, that the rounded portion formed by the reverse bending of the part 5 will be pushed beneath the rail, which action will depress the member 5, and because it is made of resilient metal it will flex and when the body of the clip is completely pushed against the body of the rail, the end of the part 5 will have passed from beneath the lower end of the rail and will snap upwardly into the position which is shown in Figures 2 and 3. As thus shown, the end of the part 5 engaging against the inner wall of the rail, prevents the clip from any outward movement which would tend to separate the clip from the rail. It may well be that the resilient action of the end of the part 5 against the rear surface of the rail may be sufficient to hold the clip against upward displacement with respect to the rail, but to insure against upward displacement, the body of the clip as before described, is provided with a tongue 6, which is formed with the extension 7, which extension will snap beneath the lower end of the rail when the clip is in its final position. This is accomplished by virtue of the inherent resiliency of the tongue 6.

The foregoing structure of the clip and its cooperation with the rail is such that the clip is firmly attached to the rail. The removal of the clip may be accomplished by depressing the member 5 so that the end thereof may pass underneath the rail and at the same time pushing the clip outwardly and away from the rail.

The lower portion of the body of the clip is provided with substantially right angle short extensions 13, which when the clip is mounted upon the rail may engage with the underside of the rail.

Mounted upon the body of the clip is a bracket or similar device which is adapted to receive any article or part of an article which is to be supported by means of the clip. In the present instance the bracket is a U-shaped member which is indicated on the drawing by the reference numeral 8, in the present instance, fastened to the body by means of rivets, which are indicated at 9. The material of which the body of the bracket is made may be inherently resilient, that is to say, made of a metal which is inherently resilient and serving as a receiving and holding means for the article which is to be supported. However, if it be desired to more securely fasten the article thus to be supported, there is shown pivoted cover members 10 and 11 which may be held together when an article is inserted within the bracket 8, by means of any desired fastening means, an example of which is the bolt and nut structure indicated at 12 in Fig. 1.

The construction and arrangement of parts which is shown and described constitutes the best disclosure of my invention of which I am now possessed, but I intend to include as a part of my invention any modification of the disclosed structure, coming within the terms of the claims which are appended hereto.

Having thus described my invention, I claim:

1. A clip adapted to be mounted upon a rail which has first and second spaced parallel boundary portions, said clip comprising a substantially flat body portion upon which is mounted an article receiving member, said body portion having at one end an integrally formed reversely extending recessed portion for engagement with the first portion of a rail, the opposite end of said body portion having a substantially right angle extension provided with a reversely folded part, said right angle extension being adapted to extend across the second portion of the rail with the end of said reversely folded part of the extension engaging the rear side of the rail to thereby clamp the body portion of the clip against said rail, a tongue member formed centrally in said body portion adjacent the right angle extension, and having a free end adjacent the second boundary portion of the said tongue member being reversely bent to extend outwardly of the plane of said body portion and the free end thereof being adapted to engage the second portion of the rail.

2. A clip adapted to be mounted upon a rail which has an upper and lower portion, said clip comprising a substantially flat body portion upon which is mounted an article receiving member, said body portion having at one end an integrally formed reversely extending recessed portion for engagement with the upper portion of a rail, the opposite end of said body portion having a substantially right angle extension provided with a reversely folded part, said right angle extension being adapted to extend across the lower portion of the rail with the end of said reversely folded part of the extension engaging the rear side of the rail to thereby clamp the body portion of the clip against said rail, a tongue member formed centrally in said body portion adjacent the right angle extension, said tongue member at its free end being bent and adapted to engage the lower portion of the rail when the clip is mounted upon a rail, and an angular extension formed on each side of said body portion on opposite sides of said tongue member and adapted to engage the lower portion of the rail at a point thereon spaced longitudinally of said tongue member.

References Cited in the file of this patent

UNITED STATES PATENTS

| | | |
|---|---|---|
| 617,962 | Kirby | Jan. 17, 1899 |
| 1,374,204 | Hucle | Apr. 12, 1921 |
| 1,835,062 | Kreuder | Dec. 8, 1931 |
| 2,282,624 | Upson | May 12, 1942 |
| 2,351,525 | Leary | June 13, 1944 |
| 2,566,886 | Hartman | Sept. 4, 1951 |
| 2,599,303 | Ward | June 3, 1952 |
| 2,665,869 | Samuels | Jan. 12, 1954 |
| 2,668,342 | Nelsson | Feb. 9, 1954 |

FOREIGN PATENTS

| | | |
|---|---|---|
| 557,128 | France | 1923 |
| 577,499 | Germany | May 31, 1933 |